US009499929B2

(12) United States Patent
Farmer

(10) Patent No.: US 9,499,929 B2
(45) Date of Patent: Nov. 22, 2016

(54) HIGH-LOFT NONWOVEN INCLUDING STABILIZER OR BINDER

(75) Inventor: Douglas K. Farmer, Greensboro, NC (US)

(73) Assignee: INVISTA North America S.a.r.l., Wilmington, DE (US)

( * ) Notice: Subject to any disclaimer, the term of this patent is extended or adjusted under 35 U.S.C. 154(b) by 822 days.

(21) Appl. No.: 12/269,412

(22) Filed: Nov. 12, 2008

(65) Prior Publication Data

US 2009/0142979 A1 Jun. 4, 2009

Related U.S. Application Data

(60) Provisional application No. 60/991,048, filed on Nov. 29, 2007.

(51) Int. Cl.

| | | |
|---|---|---|
| *B32B 27/04* | (2006.01) | |
| *D04H 1/64* | (2012.01) | |
| *B32B 5/02* | (2006.01) | |
| *B32B 5/26* | (2006.01) | |
| *D04H 1/00* | (2006.01) | |
| *D04H 1/541* | (2012.01) | |
| *D04H 1/587* | (2012.01) | |
| *B32B 5/08* | (2006.01) | |
| *A41C 3/12* | (2006.01) | |
| *A41C 5/00* | (2006.01) | |
| *B29C 43/00* | (2006.01) | |
| *B29K 105/00* | (2006.01) | |
| *B29K 105/04* | (2006.01) | |
| *B29L 31/48* | (2006.01) | |

(52) U.S. Cl.
CPC ............... *D04H 1/641* (2013.01); *B32B 5/022* (2013.01); *B32B 5/08* (2013.01); *B32B 5/26* (2013.01); *D04H 1/005* (2013.01); *D04H 1/541* (2013.01); *D04H 1/587* (2013.01); *A41C 3/12* (2013.01); *A41C 5/005* (2013.01); *B29C 43/003* (2013.01); *B29K 2105/0002* (2013.01); *B29K 2105/04* (2013.01); *B29L 2031/4885* (2013.01); *B32B 2250/20* (2013.01); *B32B 2255/02* (2013.01); *B32B 2255/26* (2013.01); *B32B 2262/0253* (2013.01); *B32B 2262/0276* (2013.01); *B32B 2262/14* (2013.01); *B32B 2307/4026* (2013.01); *B32B 2307/718* (2013.01); *B32B 2307/732* (2013.01); *B32B 2437/00* (2013.01); *B32B 2601/00* (2013.01); *Y10T 442/2377* (2015.04)

(58) Field of Classification Search
CPC ............. B32B 5/022; A41C 3/00; A41C 3/12; A41C 5/005; B29L 2031/4855
USPC ....................................................... 442/105
See application file for complete search history.

(56) References Cited

U.S. PATENT DOCUMENTS

| | | | |
|---|---|---|---|
| 3,759,775 A | | 9/1973 | Shepherd |
| 3,947,207 A | | 3/1976 | Magidson et al. |
| 4,091,819 A | | 5/1978 | Huber et al. |
| 4,148,322 A | * | 4/1979 | Jacaruso et al. ................ 450/40 |
| 4,742,095 A | * | 5/1988 | Markusch et al. ............ 523/322 |
| 4,883,707 A | | 11/1989 | Newkirk |
| 5,338,500 A | | 8/1994 | Halm et al. |
| 5,368,925 A | | 11/1994 | Hosokawa et al. |
| 5,591,289 A | * | 1/1997 | Souders et al. ................ 156/148 |
| 6,485,352 B1 | * | 11/2002 | Batcha et al. .................. 450/41 |
| 6,623,681 B1 | | 9/2003 | Taguchi et al. |
| 6,670,035 B2 | | 12/2003 | Pittman et al. |
| 6,984,708 B2 | * | 1/2006 | Liu et al. ......................... 528/62 |
| 7,240,371 B2 | | 7/2007 | Liu et al. |
| 8,058,343 B2 | * | 11/2011 | Liu et al. ....................... 524/591 |
| 2002/0087137 A1 | * | 7/2002 | Christoffel et al. ...... 604/385.01 |
| 2002/0153641 A1 | * | 10/2002 | Hernandez et al. .......... 264/442 |
| 2003/0055206 A1 | * | 3/2003 | Haile et al. ................... 528/272 |
| 2003/0134094 A1 | | 7/2003 | Zafiroglu et al. |
| 2003/0186618 A1 | * | 10/2003 | Oneyear et al. ................ 450/74 |
| 2003/0194552 A1 | * | 10/2003 | Pittman et al. ............... 428/364 |
| 2003/0232552 A1 | | 12/2003 | So |
| 2004/0043688 A1 | * | 3/2004 | Soerens et al. ............... 442/149 |
| 2004/0219854 A1 | * | 11/2004 | Groitzsch et al. ............ 442/328 |
| 2005/0165200 A1 | * | 7/2005 | Selle et al. ....................... 528/49 |
| 2006/0183851 A1 | * | 8/2006 | Liu et al. ....................... 524/589 |
| 2006/0183852 A1 | * | 8/2006 | Liu et al. ....................... 524/591 |
| 2006/0270821 A1 | * | 11/2006 | Palmer et al. ................... 528/49 |
| 2007/0264462 A1 | * | 11/2007 | Covelli et al. ................. 428/43 |
| 2008/0004395 A1 | * | 1/2008 | Covelli et al. ................ 524/591 |
| 2009/0142979 A1 | * | 6/2009 | Farmer ......................... 442/105 |

FOREIGN PATENT DOCUMENTS

| | | |
|---|---|---|
| EP | 0117458 A2 | 4/1984 |
| EP | 1842865 | 10/2007 |

(Continued)

OTHER PUBLICATIONS

Reisch, Mark. Chemical and Engineering News. Feb. 15, 1999. vol. 77, No. 7. p. 70. Obtained from http://pubs.acs.org/cen/whatstuff.stuff/7707scitek4.html.*

(Continued)

*Primary Examiner* — Michael A Salvitti

(74) *Attorney, Agent, or Firm* — Bridget C. Sciamanna

(57) ABSTRACT

The present invention is directed to a high-loft nonwoven including a binder or stabilizer including a polyurethaneurea composition that provides flexibility and compression recovery to the nonwoven structure. Included is a polyurethaneurea dispersion as a stabilizer or binder for the short-length fibers which create the high-loft nonwoven structure. The invention is useful as an improved alternative for such things as polyurethane foam in applications such as bra cups.

9 Claims, No Drawings

(56) References Cited

FOREIGN PATENT DOCUMENTS

GB          1152543      5/1969
WO     2006086715    8/2006

OTHER PUBLICATIONS

Das. Indian Journal of Fibre and Textile Research. vol. 35, Dec. 2010, pp. 303-309. Obtained from http://nopr.niscair.res.in/bitstream/123456789/10745/1/IJFTR%2035(4)%2020303-309.pdf on Nov. 20, 2014.*

English Translation of Office Action issued to Taiwan Patent No. 097145477 on Mar. 4, 2014.

Office Action issued to Taiwan Patent No. 097145477 on Mar. 4, 2014.

INDA, "Nonwovens Glossary," Association of the Nonwoven Fabrics Industry, 2002, 79 pages.

* cited by examiner

HIGH-LOFT NONWOVEN INCLUDING STABILIZER OR BINDER

BACKGROUND OF THE INVENTION

1. Field of the Invention

The present invention is directed to a high-loft nonwoven including a binder or stabilizer including a polyurethaneurea composition that provides flexibility and compression recovery to the nonwoven structure. Included is a polyurethaneurea dispersion as a stabilizer or binder for the short-length fibers which create the high-loft nonwoven structure. The invention is useful as an improved alternative for such things as polyurethane foam in applications such as bra cups.

2. Summary of the Related Technology

Most bras are made with some form of padding in the cup. Padding is used for shape and size enhancement as well as for modesty purposes. Fiberfill was used in the past to form bra cup padding, but because the fibers could migrate within the cup, particularly during laundering, the cups would become misshapen or lumpy.

As padded bras increased in popularity, bra manufacturers began using polyurethane (PU) foam as an alternative to fiberfill. PU foam has enjoyed a massive substitution for fiberfill. While PU foam is soft, light, and can be shaped by molding, PU foam has a major deficiency which is yellowing due to oxidation and/or photochemical reaction. Manufacturers, at considerable expense (such as using multiple layers of fabric), design bras in such a way as to conceal PU foam in order to disguise the yellowing. In addition, PU foam lacks has poor breatheability, permeability, and vapor transmission characteristics.

U.S. Pat. No. 3,947,207 to Magidson, et al. recognizes the challenges associated with preparing a padded bra cup that maintains its shape after repeated washings. The fiberfill pads include a resin binder that is nearly fully cured prior to stretching forming the pads to the desired shape. In order to compensate for this, an additional polyurethane resin is applied. The disadvantage is that the polyurethane imparts a stiffness to the bra pad which is uncomfortable to the wearer. This alternative was not commercially acceptable which is one reason why the switch to PU foam was made.

U.S. Pat. No. 4,091,819 to Huber et al. also discloses a padded bra cup including a fiberfill padding. A resin binder such as an acrylic, polyester, acetate or combinations thereof are added to the padding to increase shape retention during washing. The problems associated with stiffness of the padding are recognized and compensated for by perforating the padding after the introduction of the resin. Although this provides an increase in flexibility, this is a costly step and does not provide an adequate solution to the comfort issue.

U.S. Pat. No. 6,670,035 to Pittman et al. discloses binder fiber with a non-woven web that includes a low-melt binder fiber. However, such compositions are not suitable for molded applications since they would result in a hard molded article.

Therefore, there is a need for an alternative high loft nonwoven material which maintains its shape after washing, but also provides benefits of flexibility and compression recovery that are essential for wearer comfort.

SUMMARY OF THE INVENTION

In some embodiments are an article including a high-loft nonwoven composition and a stabilizer that overcomes the deficiencies of stabilizer or binder compositions. The high-loft nonwoven may include a fiberfill in combination with a polyurethaneurea composition such as a polyurethaneurea dispersion. This combination provides flexibility, stretch-recovery, compression-recovery, breathability, and color stability over time and after several washings including machine washing.

An additional benefit of using the polyurethaneurea compositions with the nonwovens of some embodiments is that that polyurethaneurea imparts stretch recovery properties. Stretch recovery is not present with the use of conventional binder compositions such as acrylics and polyurethane.

Also includes is a bra cup made with a stabilized fiberfill. The stabilizer is provided by a polyurethane composition such as a polyurethaneurea dispersion. By using the polyurethaneurea aqueous dispersion as a binder for the fiberfill in a high-loft nonwoven structure, the issues of foam degradation and the fiberfill migration are addressed. Bra cups made with stabilized fiberfill can be more breathable, lightweight, moldable, and more stable in color as compared to PU foam cups.

In another embodiment is a method of preparing an article. This includes providing a high-loft nonwoven which includes fiberfill. The nonwoven is contacted with a polyurethaneurea composition. The polyurethaneurea composition may be in the form of an aqueous dispersion.

DETAILED DESCRIPTION OF THE INVENTION

As used herein, the term "aqueous polyurethane dispersion" refers to a composition containing at least a polyurethane or polyurethane urea polymer or prepolymer (such as the polyurethane prepolymer described herein), optionally including a solvent, that has been dispersed in an aqueous medium, such as water, including deionized water.

As used herein, the term "solvent," unless otherwise indicated, refers to a non-aqueous medium, wherein the non-aqueous medium includes organic solvents, including volatile organic solvents (such as acetone) and somewhat less volatile organic solvents (such as N-methylpyrrolidone (NMP)).

As used herein, the term "solvent-free" or "solvent-free system" refers to a composition or dispersion wherein the bulk of the composition or dispersed components has not been dissolved or dispersed in a solvent.

As used herein, the term "molded" article refers to a result by which the shape of an article or shaped article is changed for example by drying the article in a mold or in response to application of heat and/or pressure.

As used herein, the term "fiberfill" is meant to include relatively short fibers that are randomly packed together to result in a density suitable to a variety of applications.

The fiberfill compositions useful in some embodiments can include any of a variety of natural and man-made fibers. Specific examples of high loft nonwoven fabrics are disclosed in U.S. Pat. No. 4,883,707 to Newkirk, which is incorporated herein by reference in its entirety. The natural fibers may be of animal, vegetable or mineral origin. The man-made fibers may be artificial such as regenerated or solvent spun or synthetic such as inorganic and petrochemical derived fibers. Specific examples include cotton, wool, acrylic, polyamide (nylon), polyester, spandex, regenerated cellulose, rubber (natural or synthetic), bamboo, silk, soy and combinations thereof, such as a polyester/cotton blend. Polyester fiberfill is a common material used in pillows and bra padding.

Bicomponent fibers may also be included in the fiberfill compositions. Bicomponent fibers can be especially useful in preparing a high-loft nonwoven due to their crimp properties. Examples of useful bicomponent fibers are those including a polymer combination selected from the group consisting of polyethylene/polypropylene, polyethylene/polyester, polypropylene/polyester, copolyester/polyester, and combinations thereof.

The polyurethaneurea compositions may be in solution, aqueous dispersion or solvent-free aqueous dispersion form. The composition may be applied in any manner known in the art including spraying, padding, dipping, immersing, coating (such as with a kiss roll or a gravure printing process), and combinations thereof.

After the fiberfill composition has been supplied and contacted with the polyurethaneurea composition, the resulting article may be additionally treated. The article may be dried or allowed to dry at room temperature. Methods of reducing drying time include the application of heat which includes forced hot air, heating such as in an oven, application of microwave, among others known in the art.

The article may also be molded. This molding may occur prior to or after the application of the polyurethaneurea composition to the high-loft nonwoven. For example, the high-loft nonwoven may be place into a mold after which the polyurethaneurea composition is applied. The article may then be dried or heated. Alternatively, the high-loft nonwoven may be prepared and then either before or after drying it may be placed into a mold and optionally heated. Pressure may also be applied during the molding process.

In some embodiments, the high-loft nonwoven may be placed between two layers of fabric and allowed to dry to heated, optionally with the application of pressure. The fabric-nonwoven-fabric provides a multiple layer article which may be also be molded. A molded article in this manner is useful for a variety of end uses including body-shaping garments such as a brassiere cup, but also has usefulness in preparation of upholstery and other household and automotive items.

As mentioned above, the articles of some embodiments that include high-loft nonwovens in combination with polyurethaneurea compositions are useful for a variety of end-uses. This includes, fabrics, garments, upholstery, pillows, and window treatments, among others.

Aqueous polyurethaneurea dispersions useful in some embodiments may be provided from particular urethane prepolymers. The prepolymers include the reaction product of a polyol and an isocyanate which is then chain extended to form a segmented polyurethaneurea composition. Specific examples are set forth in U.S. Pat. No. 7,240,371 and U.S. patent application Ser. No. 11/780,819, filed on Jul. 20, 2007, which are incorporated herein by reference in their entirety. Alternatively, a polyurethaneurea solution may be used. Such solutions are known to those of skill in the art including those from which spandex fiber is prepared.

In some embodiments, a segmented polyurethaneurea for making a polyurethaneurea solution or dispersion includes: a) a polyol or a polyol copolymer or a polyol mixture of number average molecular weight between 500 to 5000 (such as from about 600 to 4000 and 600 to 3500), including but not limited to polyether glycols, polyester glycols, polycarbonate glycols, polybutadiene glycols or their hydrogenated derivatives, and hydroxy-terminated polydimethylsiloxanes; b) a polyisocyanate including diisocyanates such as aliphatic diisocyanates, aromatic diisocyanates and alicyclic diisocyanates; and for the dispersions c) a diol compound including: (i) hydroxy groups capable of reacting with polyisocyanate, and (ii) at least one carboxylic acid group capable of forming a salt upon neutralization, wherein the at least one carboxylic acid group is incapable of reacting with the polyisocyanate; d) a neutralizing agent; e) chain extenders such as water, diol or an diamine chain extender including aliphatic diamine chain extenders or the combination of an aliphatic diamine chain extender with one or more diamines selected from aliphatic diamines and alicyclic diamines having 2 to 13 carbon atoms, or an amino-terminated polymer; and f) optionally a monoalcohol or monoamine, primary or secondary, as a blocking agent or chain terminator; and optionally an organic compound or a polymer with at least three primary or secondary amine groups.

The urethane prepolymers of some embodiments, also known as capped glycols, can generally be conceptualized as the reaction product of a polyol, a polyisocyanate, and a compound capable of salt-forming upon neutralization, before the prepolymer is dispersed in water and is chain-extended. Such prepolymers can typically be made in one or more steps, with or without solvents which can be useful in reducing the viscosity of the prepolymer composition.

Depending on whether the prepolymer is dissolved in a less volatile solvent (such as NMP) which will remain in the dispersion; dissolved in a volatile solvent such as acetone or methylethyl ketone (MEK), which can be later removed; or is dispersed in water without any solvent; the dispersion process can be classified in practice as the solvent process, acetone process, or prepolymer mixing process, respectively. The prepolymer mixing process has environmental and economical advantages, and may be used in the preparation of aqueous dispersion with substantially no added solvent.

In the prepolymer mixing process, it is important that the viscosity of the prepolymer is adequately low enough, with or without dilution by a solvent, to be transported and dispersed in water. Polyurethaneurea dispersions derived from such a prepolymer, which meet this viscosity requirement and do not have any organic solvent in the prepolymer or in the dispersion may be used.

Depending on the desired effect of the polyurethaneurea dispersion, the weight average molecular weight of the polymer in the dispersion may vary from about 40,000 to about 250,000, including from about 40,000 to about 150,000; from about 70,000 to about 150,000; from about 100,000 to about 150,000; and about 120,000 to about 140,000.

The components of the polyurethaneurea compositions of some embodiments are described in more detail below:
Polyols Polyol components suitable as a starting material for preparing urethane prepolymers, according to the invention, are polyether glycols, polycarbonate glycols, and polyester glycols of number average molecular weight of about 600 to about 3,500 or about 4,000.

Examples of polyether polyols that can be used include those glycols with two or more hydroxy groups, from ring-opening polymerization and/or copolymerization of ethylene oxide, propylene oxide, trimethylene oxide, tetrahydrofuran, and 3-methyltetrahydrofuran, or from condensation polymerization of a polyhydric alcohol, such as a diol or diol mixtures, with less than 12 carbon atoms in each molecule, such as ethylene glycol, 1,3-propanediol, 1,4-butanediol, 1,5-pentanediol 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. Specific examples of polyols include, a linear, bifunctional polyether polyol, and a poly(tetramethylene ether) glycol of molecular weight of about 1,700 to about 2,100, such as Terathane® 1800 (Invista) with a functionality of 2.

Examples of polyester polyols that can be used include those ester glycols with two or more hydroxy groups, produced by condensation polymerization of aliphatic polycarboxylic acids and polyols, or their mixtures, of low molecular weights with no more than 12 carbon atoms in each molecule. Examples of suitable polycarboxylic acids are malonic acid, succinic acid, glutaric acid, adipic acid, pimelic acid, suberic acid, azelaic acid, sebacic acid, undecanedicarboxylic acid, and dodecanedicarboxylic acid. Examples of suitable polyols for preparing the polyester polyols are ethylene glycol, 1,3-propanediol, 1,4-butanediol, 1,5-pentanediol 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear bifunctional polyester polyol may have a melting temperature of about 5° C. to about 50° C.

Examples of polycarbonate polyols that can be used include those carbonate glycols with two or more hydroxy groups, produced by condensation polymerization of phosgene, chloroformic acid ester, dialkyl carbonate or diallyl carbonate and aliphatic polyols, or their mixtures, of low molecular weights with no more than 12 carbon atoms in each molecule. Examples of suitable polyols for preparing the polycarbonate polyols are diethylene glycol, 1,3-propanediol, 1,4-butanediol, 1,5-pentanediol, 1,6-hexanediol, neopentyl glycol, 3-methyl-1,5-pentanediol, 1,7-heptanediol, 1,8-octanediol, 1,9-nonanediol, 1,10-decanediol and 1,12-dodecanediol. A linear, bifunctional polycarbonate polyol may have a melting temperature of about 5° C. to about 50° C.

Polyisocyanates

Examples of suitable polyisocyanate components include diisocyanates such as 1,6-diisocyanatohexane, 1,12-diisocyanatododecane, isophorone diisocyanate, trimethyl-hexamethylenediisocyanates, 1,5-diisocyanato-2-methylpentane, diisocyanato-cyclohexanes, methylene-bis(4-cyclohexyl isocyanate), tetramethyl-xylenediisocyanates, bis(isocyanatomethyl) cyclohexanes, toluenediisocyanates, methylene bis(4-phenyl isocyanate), phenylenediisocyanates, xylenediisocyanates, and a mixture of such diisocyanates. For example the diisocyanate may be an aromatic diisocyanate such phenylenediisocyanate, tolylenediisocyanate (TDI), xylylenediisocyanate, biphenylenediisocyanate, naphthylenediisocyanate, diphenylmethanediisocyanate (MDI), and combinations thereof.

The polyisocyanate component, suitable as another starting material for making urethane prepolymers according to the invention, can be an isomer mixture of diphenylmethane diisocyanate (MDI) containing 4,4'-methylene bis(phenyl isocyanate) and 2,4'-methylene bis(phenyl isocyanate) in the range of 4,4'-MDI to 2,4'-MDI isomer ratios of between about 65:35 to about 35:65, including the range of about 55:45 to about 45:55 and about 50:50. Examples of suitable polyisocyanate components include Mondur® ML (Bayer), Lupranate® MI (BASF), and Isonate® 50 O,P' (Dow Chemical).

Diols

Diol compounds, suitable as further starting materials for preparing urethane prepolymers according to the invention, include at least one diol compound with: (i) two hydroxy groups capable of reacting with the polyisocyanates; and (ii) at least one carboxylic acid group capable of forming salt upon neutralization and incapable of reacting with the polyisocyanates (b). Typical examples of diol compounds having a carboxylic acid group, include 2,2-dimethylopropionic acid (DMPA), 2,2-dimethylobutanoic acid, 2,2-dimethylovaleric acid, and DMPA initiated caprolactones such as CAPA® HC 1060 (Solvay).

Neutralizing Agents

Examples of suitable neutralizing agents to convert the acid groups to salt groups include: tertiary amines (such as triethylamine, N,N-diethylmethylamine, N-methylmorpholine, N,N-diisopropylethylamine, and triethanolamine) and alkali metal hydroxides (such as lithium, sodium and potassium hydroxides). Primary and/or secondary amines may be also used as the neutralizing agent for the acid groups. The degrees of neutralization are generally between about 60% to about 140%, for example, in the range of about 80% to about 120% of the acid groups.

Chain Extenders

The chain extenders useful with the present invention include diamine chain extenders and water. Many examples of useful chain extenders are known by those of ordinary skill in the art. Examples of suitable diamine chain extenders include: 1,2-ethylenediamine, 1,4-butanediamine, 1,6-hexamethylenediamine, 1,12-dodecanediamine, 1,2-propanediamine, 2-methyl-1,5-pentanediamine, 1,2-cyclohexanediamine, 1,4-cyclohexanediamine, 4,4'-methylene-bis (cyclohexylamine), isophorone diamine, 2,2-dimethyl-1,3-propanediamine, meta-tetramethylxylenediamine, and Jeffamine® (Texaco) of molecular weight less than 500.

Surface Active Agents

Examples of suitable surface active agents (surfactants) include: anionic, cationic, or nonionic dispersants or surfactants, such as sodium dodecyl sulfate, sodium dioctyl sulfosuccinate, sodium dodecylbenzenesulfonate, ethoxylated allkylphenols such as ethoxylated nonylphenols, and ethoxylated fatty alcohols, lauryl pyridinium bromide, polyether phosphates and phosphate esters, modified alcohol-ethoxylates, and combinations thereof.

Blocking Agents

The blocking agent for isocyanate groups may be either a monofunctional alcohol or a monofunctional amine. The blocking agent may be added at any time prior to formation of the prepolymer, during the formation of the prepolymer, or after the formation of the prepolymer including before and after dispersing the prepolymer into an aqueous medium such as deionized water. In some embodiments, the blocking agent is optional, or may be excluded. In other embodiments, based on the weight of the prepolymer, the blocking agent may be included in an amount from about 0.05% to about 10.0%, including about 0.1% to about 6.0% and about 1.0% to about 4.0%. Based on the weight of the final dispersion, the blocking agent may be present in an amount from about 0.01% to about 6.0%, including about 0.05% to about 3%, and about 0.1% to about 1.0%.

The inclusion of a blocking agent permits control over the weight average molecular weight of the polymer in the dispersion as well as providing control over the polymer molecular weight distribution. The effectiveness of the blocking agent to provide this control depends on the type of the blocking agent and when the blocking agent is added during the preparation of the dispersion. For example, a monofunctional alcohol may be added prior to the formation of the prepolymer, during or after the formation of the prepolymer. The monofunctional alcohol blocking agent may also be added to the aqueous medium into which the prepolymer is dispersed, or immediately following the dispersion of the prepolymer into the aqueous medium. However, when control over the polymer molecular weight and the molecular weight distribution in the final dispersion is desired, the monofunctional alcohol may be most effective if added and reacted as part of the prepolymer before it is dispersed. If the monofunctional alcohol is added to the aqueous medium during or after dispersing the prepolymer, its effectiveness in controlling the polymer molecular weight will be reduced due to the competing chain extension reaction.

Examples of monofunctional alcohols useful with the present invention include at least one member selected from the group consisting of aliphatic and cycloaliphatic primary and secondary alcohols with 1 to 18 carbons, phenol, substituted phenols, ethoxylated alkyl phenols and ethoxylated fatty alcohols with molecular weight less than about 750, including molecular weight less than 500, hydroxyamines, hydroxymethyl and hydroxyethyl substituted tertiary amines, hydroxymethyl and hydroxyethyl substituted heterocyclic compounds, and combinations thereof, including furfuryl alcohol, tetrahydrofurfuryl alcohol, N-(2-hydroxyethyl)succinimide, 4-(2-hydroxyethyl)morpholine, methanol, ethanol, butanol, neopentyl alcohol, hexanol, cyclohexanol, cyclohexanemethanol, benzyl alcohol, octanol, octadecanol, N,N-diethylhydroxylamine, 2-(diethylamino)ethanol, 2-dimethylaminoethanol, and 4-piperidineethanol, and combinations thereof.

When a monofunctional amine compound, such as a monofunctional dialkyl amine is used as a blocking agent for isocyanate groups, it may also be added at any time during preparation of the dispersion, desirably the monofunctional amine blocking agent is added to the water medium during or after the prepolymer dispersion. For example, the monofunctional amine blocking agent can be added to the water mixture immediately after the prepolymer is dispersed.

Examples of suitable mono-functional dialkylamine blocking agents include: N,N-diethylamine, N-ethyl-N-propylamine, N,N-diisopropylamine, N-tert-butyl-N-methylamine, N-tert-butyl-N-benzylamine, N,N-dicyclohexylamine, N-ethyl-N-isopropylamine, N-tert-butyl-N-isopropylamine, N-isopropyl-N-cyclohexylamine, N-ethyl-N-cyclohexylamine, N,N-diethanolamine, and 2,2,6,6-tetramethylpiperidine. The molar ratio of the amine blocking agent to the isocyanate groups of the prepolymer prior to dispersion in water generally should range from about 0.05 to about 0.50, for example from about 0.20 to about 0.40. Catalysts may be used for the de-blocking reactions.

Optionally at least one polymeric component (MW>about 500), with at least three or more primary and/or secondary amino groups per mole of the polymer, may be added to the water medium after the prepolymer is dispersed and the blocking agent is added. Examples of the suitable polymeric component include polyethylenimine, poly(vinylamine), poly(allylamine), and poly(amidoamine) dendrimers, and combinations thereof.

Other Additives

Examples of suitable antifoaming or defoaming or foam controlling agents include: Additive 65 and Additive 62 (silicone based additives from Dow Corning), FoamStar® I 300 (a mineral oil based, silicone free defoamer from Cognis) and Surfynol™ DF 110L (a high molecular weight acetylenic glycol non-ionic surfactant from Air Products & Chemicals).

Examples of suitable rheological modifiers include: hydrophobically-modified ethoxylate urethanes (HEUR), hydrophobically-modified alkali swellable emulsions (HASE), and hydrophobically-modified hydroxy-ethyl cellulose (HMHEC).

Other additives that may be optionally included in the aqueous dispersion or in the prepolymer include: antioxidants, UV stabilizers, colorants, pigments, crosslinking agents, phase change materials (e.g., Outlast®, commercially available from Outlast Technologies, Boulder, Colo.), antimicrobials, minerals (e.g., copper), microencapsulated well-being additives (e.g., aloe vera, vitamin E gel, aloe vera, sea kelp, nicotine, caffeine, scents or aromas), nanoparticles (e.g., silica or carbon), calcium carbonate, flame retardants, antitack additives, chlorine degradation resistant additives, vitamins, medicines, fragrances, electrically conductive additives, and/or dye-assist agents. Other additives which may be added to the prepolymer or the aqueous dispersion comprise adhesion promoters, anti-static agents, anti-cratering agents, anti-crawling agents, optical brighteners, coalescing agents, electroconductive additives, luminescent additives, flow and leveling agents, freeze-thaw stabilizers, lubricants, organic and inorganic fillers, preservatives, texturizing agents, thermochromic additives, insect repellants, and wetting agents.

Optional additives may be added to the aqueous dispersion before, during, or after the prepolymer is dispersed.

The coating or dispersion, film or shaped article may be pigmented or colored before or after addition to the nonwoven.

The features and advantages of the present invention are more fully shown by the following examples which are provided for purposes of illustration, and are not to be construed as limiting the invention in any way.

EXAMPLES

Several bra cups were produced which included a polyurethaneurea aqueous dispersion with weight average molecular weight of approximately 120,000. Polyester fiberfill batting (typical of pillowstuffing) was spread into a rectangular pan and sprayed with the aqueous dispersion. Examples with "light" coating, "medium" coating, and "heavy" coating were prepared. After allowing the samples to dry overnight, the "light" coating seemed to pull apart with little effort, suggesting that the amount of dispersion was insufficient in bonding enough of the fibers. The "heavy" coating seemed rubbery and rigid to the touch. The "medium" coating indicated that there is an optimum loading of the polyurethaneurea dispersion that can be achieved with minimal experimentation.

A sample of the "medium" coated batting was placed between two layers of fabric and placed into a conventional foam cup molding (shaped and heated) apparatus. The molded cup was removed from the molding machine and was found to exhibit the shaped appearance and compression recovery desirable for molded bra cups.

As a comparison, several common fiberfill battings which had been stabilized with conventional binder were also molded in the foam cup molding apparatus. These samples were obtained from Kem-Wove, Inc., a commercial manufacturer of high-loft nonwovens located at 10530 Westlake Drive, Charlotte, N.C. 28273. When subjected to molding, the resulting cups exhibited a stiff characteristic not suitable for molded bra cups.

While there have been described what are presently believed to be the preferred embodiments of the invention, those skilled in the art will realize that changes and modifications may be made thereto without departing from the spirit of the invention, and it is intended to include all such changes and modifications as fall within the true scope of the invention.

What is claimed is:

1. An article comprising:
   (a) a high-loft nonwoven fiberfill comprising polyester, wherein said polyester comprises a bicomponent fiber comprising a combination selected from the group consisting of polyethylene/polyester, polypropylene/polyester, copolyester/polyester, and combinations thereof; and
   (b) a polyurethaneurea composition, wherein said polyurethaneurea composition is from an aqueous dispersion or solvent-free aqueous dispersion.

2. The article of claim 1, wherein said polyurethaneurea composition is from an aqueous dispersion.

3. The article of claim 1, wherein said polyurethaneurea composition includes a polyurethaneurea polymer which is the reaction product of:
   (a) at least one polyol selected from polyethers, polyesters, polycarbonates, and combinations thereof, wherein the polyol has a number average molecular weight of 600 to 4000;
   (b) a polyisocyanate comprising a member selected from the group consisting of aromatic diisocyantes, aliphatic diisocyanates, cycloaliphatic diiosocyanates, and combinations thereof;
   (c) at least one diol compound comprising: (i) hydroxy groups capable of reacting with polyisocyanate, and (ii) at least one carboxylic acid group capable of forming a salt upon neutralization, wherein said at least one carboxylic acid group is incapable of reacting with the polyisocyanate;
   (d) a neutralizing agent;
   (e) a chain extender;
   (f) a blocking agent for isocyanate groups comprising at least one mono-functional amine or mono-functional alcohol; and
at least one surface active agent.

4. The article of claim 3, wherein said polyisocyanate comprises a mixture of 4,4'- and 2,4'-methylene bis(phenyl isocyanate) (MDI) isomers, wherein the ratio of 4,4'-MDI to 2,4'-MDI isomers ranges from 65:35 to 35:65.

5. The article of claim 3, wherein the diol is selected from the group consisting of 2,2-dimethylopropionic acid (DMPA), 2,2-dimethylobutanoic acid, 2,2-dimethylovaleric acid, and combinations thereof.

6. The article of claim 3, wherein said polyurethaneurea polymer has a weight average molecular weight from about 40,000 to about 250,000.

7. The article of claim 3, wherein said polyurethaneurea polymer has a weight average molecular weight from about 40,000 to about 150,000.

8. The article of claim 1, wherein said article is molded.

9. The article of claim 1, wherein said article is molded into a brassiere cup.

* * * * *